Jan. 5, 1965        A. PARETO        3,164,169
BALL FAUCETS
Filed June 14, 1961

INVENTOR
AURELIO PARETO
Imirie & Smiley
Attys.

3,164,169
BALL FAUCETS

Aurelio Pareto, Genoa, Italy, assignor to Fabbrica Italiana
Plastici s.r.l., Sori-Genoa, Italy
Filed June 14, 1961, Ser. No. 117,063
Claims priority, application Italy, Mar. 29, 1961,
Patent 646,308
7 Claims. (Cl. 137—556)

The ball faucets in present use have various disadvantages, among which is the difficulty of exactly centering the ball between the two gaskets causing irregular wear of the gaskets, and further making impossible control of such wear by maintenance or repair without disassembling the faucet. Nor is it possible to replace the gaskets without removing completely the faucet from the piping.

The present invention has for its object various improvements in the ball faucets to avoid the above said disadvantages.

A ball faucet according to the invention is characterized in having seat seals replaceable by sliding the valve body along the piping so as to uncover the ball faucet, maintaining at the same time the continuity of the pipe line, and in the provision of a tubular valve body having an axial bore therethrough, a ball-shaped valve member having a flow opening therethrough and mounted within the valve body for rotation to control flow through the valve, a pair of sleeves slidably received in the bore of said valve body for connection of the valve to a pair of pipes, a pair of seat seals carried one at the inner end of each of said sleeves for sealing engagement with the ball-shaped valve member, said valve body having an axially directed slot on its tubular wall at each end, said sleeves each having a radial tooth guided in said slots and visible from the exterior of said valve body, and securing means adjustably mounted on said valve body to engage and move said sleeves inwardly of the valve body whereby to press said seat seals firmly against said valve member.

The above faucet is further characterized in that said radial teeth on the sleeves project outwardly beyond the exterior of said valve body and said securing means comprises two rings threadedly mounted on the exterior of the valve body and in engagement with the exposed portions of said radial teeth.

The above faucet is also characterized in that said valve body slots and the said radial sleeve teeth are so proportioned that when the teeth reach the inner ends of the slots, the inner portions of the sleeves engage the ball-shaped valve member, whereby to visibly indicate the complete wearing out of said seat seals and the necessity for their replacement.

The above faucet is further characterized in that at least one of said sleeves is formed in two telescoping coaxial parts so that by removing the outer one of said parts, the relative dimensions of the axial bore, valve member, inner part of said one sleeve and the associated piping being such that the valve body may be slid axially along piping connected to the faucet valve in order to replace the seat seals without removing the faucet valve completely from its connected pipes.

The above faucet is also characterized in that said valve body is provided with a lateral opening in which is mounted a control pivot for the ball-shaped valve member, said pivot having at its inner lower end a transverse groove which therefore forms two ribs separated by the groove, and said end of the control pivot is introduced into a suitable bore of complementary profile, in order to obtain a good engagement even after a long period of wear.

The above faucet is finally characterized in that a handle is mounted on the control pivot, said handle being sloped away from the longitudinal axis of the valve body so as to prevent the hand of an operator from hitting the valve body when turning said handle.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 1:
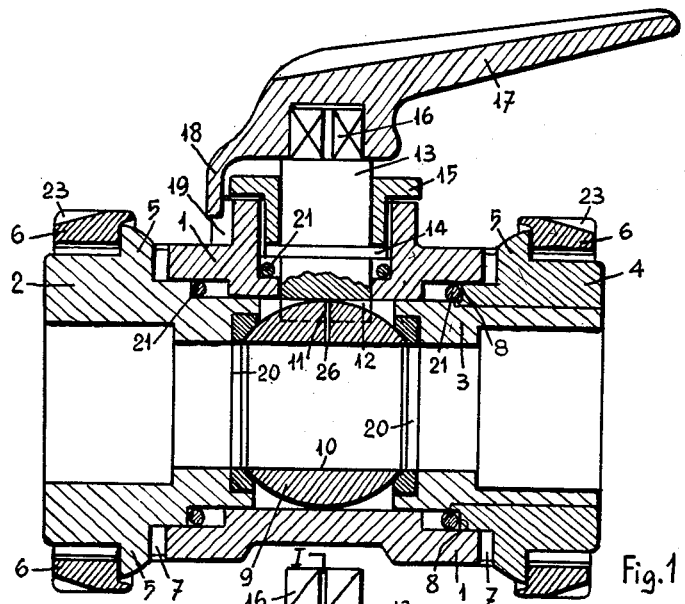
FIG. 1 is a longitudinal section of a ball faucet according to the invention, taken on line 1—1 of FIG. 2.
Figure 2:
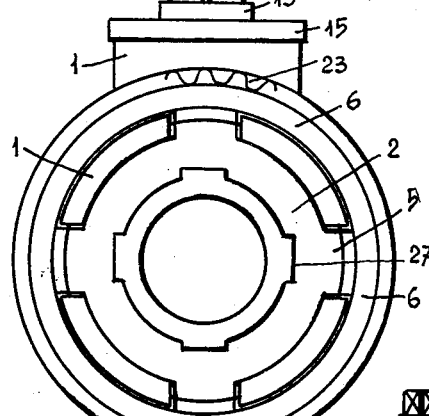
FIG. 2 is a front elevational view of the ball faucet.
Figure 3:
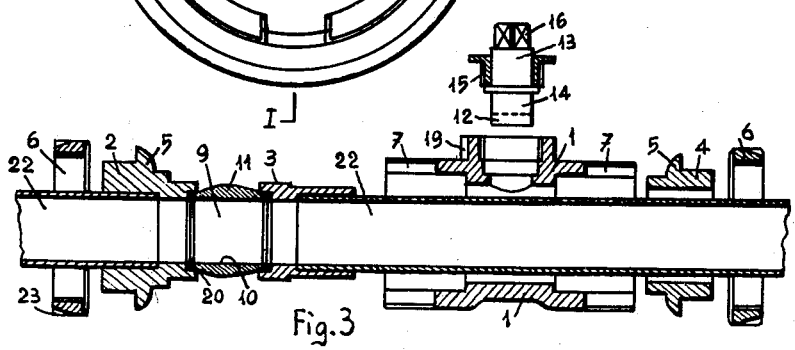
FIG. 3 is a longitudinal section, on a smaller scale, of the faucet mounted on piping, showing the body of the faucet slid along the said piping away from the ball.

Referring now more particularly to the drawing, the preferred embodiment comprises a tubular faucet body 1 within which are fastened the sleeves 2, 3 and 4; teeth 5 are formed on the sleeves 2 and 4, against which are pressed the bushes or rings, 6. A guide groove 7 is provided for teeth 5. Sleeve 3 is provided with a diametral step, or shoulder to accommodate axial movement of sleeves 2 and 4. The ball valve 9 has a passage bore 10 and the shaped bore 11 coupled on the inner end 12 of pivot 13, which is provided with an abutment shoulder 14 for seating the threaded socket 15 and with a square sectioned outer end 16 for receiving the handle 17. The handle 17 is provided with a pointer 18 cooperating with abutments 19 on the body 1. On each side of the ball valve 9 are the sealing gaskets 20 of ring shape for sealing the valve between the inner ends of sleeves 2 and 3. Other gaskets 21 in toroidal form seal sleeves 2, 3 and 4 within the valve body 1. Two lengths of pipe 22 are shown in FIG. 3 between which the faucet is connected. The securing rings have notches 23. The ball valve 9 has a small conduit 26 for the passage of the fluid, and 27, FIG. 2 are the small keyways for receiving blocking keys to hold the pipe 22 against the sleeves 2 and 3.

The described ball faucet is assembled as follows:

The various parts constituting the faucet are first arranged as in FIG. 3. Sleeves 2 and 3 are fastened to pipes 22 and between them is placed the ball 9 with interposed gaskets 20. The other parts of the faucet are slid axially to the left in FIG. 3 until they reach their respective final positions. Then the bushes 6 are screwed on the body 1. Said bushes, because of their pressure on teeth 5, move the sleeves 2 and 4 toward each other. Sleeve 2 causes its gasket 20 to press the ball valve 9; sleeve 4 presses its shoulder 8 against sleeve 3 and the other gasket 20 against the other side of ball 9 to obtain a perfect sealing.

Then the pivot 13 is introduced through an upper opening in the faucet body 1 into its seat or bore 11 on the ball valve 9 so that the ribs formed on each side of the groove 26 on its lower end 12 closely fit within the periphery of the complementary shaped bore 11 of ball 9. The socket 15 when threaded in said valve body opening keeps the pivot always in its seat.

In order to center exactly the axis of the pivot 13 with the vertical axis of ball 9, it is necessary to control tightening of bushes 6 so that the portions of grooves 7 not filled by teeth 5 are equal for both sets of teeth, i.e. those on sleeves 2 and 4. If this condition is not met the bushes must be screwed more or less to displace the body 1 until perfect centering is obtained.

After use of the faucet and resultant wear of gaskets 20, the sleeve 2 and 3 will be in contact with ball 9, the teeth 5 will then reach the axial bottoms of grooves 7, visibly indicating that the gaskets 20 are worn out and must be replaced.

For replacement of the gaskets the above stated assembly steps are performed in reverse starting from the last one and the faucet may then be reassembled with new gaskets.

The ball valve 9 may obviously be rotated so that the axis of bore 10 aligns with the axis of pipes 22 for opening the faucet or perpendicular thereto for closing the faucet.

For this purpose, the abutments 19 are arranged so as to permit the pointer 18 of handle 17 and pivot 13 to rotate for one fourth of a turn. Said handle is arranged to slope away from the longitudinal axis of the valve body, so as to prevent the hand of an operator from hitting the said body when turning the said handle.

Within the body of ball valve 9 is provided a small conduit 26 between the inner surface of passage 10 and the outer spherical surface. This conduit allows the passage of fluid under pressure to the outer surface of the spherical body and balances the pressure on the spherical body, which said fluid under pressure exerts along the piping axis. In this way it is easier to control movement of the spherical valve body; the seal against fluid exiting to the exterior of the faucet is assured by gaskets 21.

When the faucet is applied to the piping by means of threads, the tongues 27 are provided on each of the sleeves 2 and 3 to prevent the faucet valve from rotating with respect to the pipe, or vice versa during assembly or disassembly.

Although a certain specific embodiment of the invention has been shown and described, it is obvious that many modifications thereof are possible. The invention, therefore, is not to be restricted except insofar as is necessitated by the prior art and by the spirit of the appended claims.

What I claim is:

1. A ball faucet valve comprising a tubular valve body having an axial bore therethrough, a ball-shaped valve member having a flow opening therethrough and mounted within the valve body for rotation to control flow through the valve, a pair of sleeves slidably received in the bore of said valve body for connection of the valve to a pair of pipes, a pair of seat seals carried one at the inner end of each of said sleeves for sealing engagement with the ball-shaped valve member, said valve body having an axially directed slot on its tubular wall at each end, said sleeves each having a radial tooth guided in said slots and visible from the exterior of said valve body, and securing means adjustably mounted on said valve body to engage and move said sleeves inwardly of the valve body whereby to press said seat seals firmly against said valve member.

2. A faucet valve as claimed in claim 1 wherein said radial teeth on the sleeves project outwardly beyond the exterior of said valve body and said securing means comprises two rings threadedly mounted on the exterior of the valve body and in engagement with exposed portions of said radial teeth.

3. A faucet valve as claimed in claim 2 wherein said valve body slots and the said radial sleeve teeth are so proportioned that when the teeth reach the inner ends of the slots the inner portions of the sleeves engage the ball-shaped valve member, whereby to visibly indicate the complete wearing out of said seat seals and the necessity for their replacement.

4. A faucet valve as claimed in claim 2 wherein at least one of said sleeves is formed in two telescoping coaxial parts, the relative dimensions of the axial bore, valve member, inner part of said one sleeve and associated piping being such that by removing the outer one of said parts the valve body may be slid axially along piping connected to the faucet valve in order to replace the seat seals without removing the faucet valve completely from its connected pipes.

5. A faucet as claimed in claim 1 wherein said valve body is provided with a lateral opening in which is mounted a control pivot for the ball-shaped valve member, said pivot having a groove transversely of its inner end forming two ribs at the sides of the groove, and a bore of complementary profile to said pivot end in said ball-shaped valve member closely receiving said pivot end and for retaining good control engagement even after a long period of wear.

6. A faucet valve as claimed in claim 5 wherein a handle is mounted on the control pivot, said handle being sloped away from the longitudinal axis of the valve body to prevent the hand of an operator from hitting the valve body.

7. A ball faucet valve comprising a tubular valve body having an axial bore therethrough, a ball-shaped valve member having a flow opening therethrough and mounted within the valve body for rotation to control flow through the valve, a pair of sleeves slidably received in the bore of said valve body for connection of the valve to a pair of pipes, a pair of seat seals carried one at the inner end of each of sleeves for sealing engagement with the ball-shaped valve member, securing means mounted on said valve body to engage and move said sleeves inwardly of the valve body to press said seat seals firmly against said valve member and at least one of said sleeves being formed in two telescoping coaxial parts, the relative dimensions of the axial bore, valve member, inner part of said one sleeve and the associated piping being such that by removing the outer one of said parts the valve body may be slid axially along piping connected to the faucet valve in order to replace the seat seals without removing the faucet valve completely from its connected pipes.

References Cited by the Examiner
UNITED STATES PATENTS 2,995,336 8/61 Usab _____ 251—315 XR
3,033,227 5/62 Goldman _____ 251—171 XR

FOREIGN PATENTS 1,220,081 1960 France.

ISADOR WEIL, *Primary Examiner.*